(12) United States Patent
Xu et al.

(10) Patent No.: US 10,995,951 B2
(45) Date of Patent: May 4, 2021

(54) SYSTEM AND METHOD FOR CONTROLLING A POROUS MEDIUM BURNER OF MEDIUM-HIGH TEMPERATURE HEATING FIELD

(71) Applicant: Wuhan University of Science and Technology, Wuhan (CN)

(72) Inventors: Xuecheng Xu, Wuhan (CN); Yuanyuan Chen, Wuhan (CN); Bin Li, Wuhan (CN); Benwen Li, Wuhan (CN); Zhu He, Wuhan (CN); Yawei Li, Wuhan (CN); Xiong Liang, Wuhan (CN)

(73) Assignee: WUHAN UNIVERSITY OF SCIENCE AND TECHNOLOGY, Wuhan (CN)

( * ) Notice: Subject to any disclaimer, the term of this patent is extended or adjusted under 35 U.S.C. 154(b) by 266 days.

(21) Appl. No.: 16/188,928

(22) Filed: Nov. 13, 2018

(65) Prior Publication Data
US 2019/0331338 A1    Oct. 31, 2019

(30) Foreign Application Priority Data

Apr. 28, 2018    (CN) .......................... 201810400280.3

(51) Int. Cl.
*F23D 14/82*    (2006.01)
*F23D 14/18*    (2006.01)
*F23D 14/70*    (2006.01)

(52) U.S. Cl.
CPC ............. *F23D 14/82* (2013.01); *F23D 14/18* (2013.01); *F23D 14/70* (2013.01);
(Continued)

(58) Field of Classification Search
CPC .......... F23D 14/82; F23D 14/18; F23D 14/70; F23D 2203/005; F23D 2208/10;
(Continued)

(56) References Cited

U.S. PATENT DOCUMENTS 4,303,383 A * 12/1981 Black ...................... F23N 5/203
431/31
4,348,169 A *  9/1982 Swithenbank .......... F23N 1/022
431/89

(Continued)

*Primary Examiner* — Jorge A Pereiro
(74) *Attorney, Agent, or Firm* — Mai-Tram D. Lauer; Westman, Champlin & Koehler, P.A.

(57) ABSTRACT

A system and method for controlling a porous medium burner of medium-high temperature heating field, the control system includes a local control system and a remote control system; the local control system is configured for acquisition and feedback of data, and execution of an action; and the remote control system communicates with the local control system in real time and is configured for storage and analysis of data and transmission of an instruction. A system and method for controlling a porous medium burner of medium-high temperature heating field, which can effectively perform prediction and prevention of flashback, be adapted to combustion of gases with different calorific values, monitor and diagnose, in real time, a usage status of a porous medium material, and be suitable for the functions such as real-time monitoring of preheating of air and a fuel gas.

17 Claims, 2 Drawing Sheets

(52) U.S. Cl.
CPC .... *F23D 2203/005* (2013.01); *F23D 2208/10* (2013.01); *F23D 2209/10* (2013.01)

(58) Field of Classification Search
CPC ..... F23D 2209/10; F23D 14/16; Y02E 20/34; F23N 2225/16; F23N 5/00; F23N 5/123; F23N 5/24; F23N 2223/04; F23N 2223/38; F23N 2227/02; F23N 2225/08; F23N 5/265; F23C 99/006
See application file for complete search history.

(56) References Cited

U.S. PATENT DOCUMENTS

| | | | | |
|---|---|---|---|---|
| 4,812,963 | A * | 3/1989 | Albrecht | F24C 7/08 |
| | | | | 700/2 |
| 5,997,280 | A * | 12/1999 | Welz, Jr. | F23N 1/022 |
| | | | | 431/90 |
| 8,126,631 | B2 * | 2/2012 | Scalia, Jr. | F23D 11/001 |
| | | | | 701/101 |
| 2001/0056315 | A1 * | 12/2001 | Nagafuchi | H02J 3/004 |
| | | | | 700/286 |
| 2007/0068511 | A1 * | 3/2007 | Bachinsky | F24C 3/122 |
| | | | | 126/503 |
| 2009/0104573 | A1 * | 4/2009 | Chen | F24C 3/103 |
| | | | | 431/72 |
| 2011/0146649 | A1 * | 6/2011 | Brenner | F24C 3/126 |
| | | | | 126/42 |
| 2011/0234356 | A1 * | 9/2011 | Rohl | H05B 41/2925 |
| | | | | 336/192 |
| 2015/0096974 | A1 * | 4/2015 | Freeman | F24C 15/106 |
| | | | | 219/485 |
| 2015/0153725 | A1 * | 6/2015 | Matheny | G05B 19/4155 |
| | | | | 700/117 |
| 2015/0316256 | A1 * | 11/2015 | Cole | F23L 7/007 |
| | | | | 431/2 |
| 2015/0316262 | A1 * | 11/2015 | Immer | F23N 5/00 |
| | | | | 431/2 |
| 2016/0238246 | A1 * | 8/2016 | Albright | F23N 5/242 |
| 2018/0058690 | A1 * | 3/2018 | Becker | F24C 3/122 |
| 2018/0125296 | A1 * | 5/2018 | Gafford | A47J 37/0713 |
| 2019/0121350 | A1 * | 4/2019 | Celia | H04L 67/12 |
| 2020/0173659 | A1 * | 6/2020 | Bertelli | F23D 14/62 |

\* cited by examiner

SYSTEM AND METHOD FOR CONTROLLING A POROUS MEDIUM BURNER OF MEDIUM-HIGH TEMPERATURE HEATING FIELD

CROSS-REFERENCE TO RELATED APPLICATION

The present application claims the priority to a Chinese patent application No. CN201810400280.3, filed with the China Patent Office on Apr. 28, 2018 and entitled "System and Method for Controlling Porous Medium Burner of Medium-High Temperature Heating Field", the content of which is incorporated herein in its entirety.

TECHNICAL FIELD

The present disclosure relates to the technical field of control systems, and in particular relates to a system and method for controlling a porous medium burner of medium-high temperature heating field.

BACKGROUND ART

With the continuous development of industry in China, increasingly serious energy and environmental problems have become one of the bottlenecks restricting the economic development in China, which prominently show that energy is utilized at low efficiency and quality, and a lot of pollutants are emitted in the combustion process. At present, the combustion of gaseous fuels in industrial production in China is mainly atmospheric combustion characterized by free flame, in such combustion mode, there is a large temperature gradient near the flame surface, and the existence of a partial high-temperature zone causes the generation of a large amount of NOx, resulting in incomplete combustion, production of a great amount of CO, and poor combustion stability.

Porous medium combustion technology is a new combustion mode developed in the international combustion field in the recent more than ten years. Compared with flaming combustion with partially high temperature during combustion, such combustion does not have an open flame and remarkably reduces the generation of pollutants such as NOx and CO, which may be reduced by 70% or more. Due to a remarkable increase in overall temperature and an increase in radiative heat transfer, the efficiency of utilization of combustion heat is greatly improved, and even exceeds 50% in some cases. In addition, the porous medium combustion technology has significant advantages for use of low-calorific-value (poor-quality) fuels (blast furnace gas, organic waste gas, etc.). Being gathered with the advantages of energy saving, emission reduction, and environmental friendliness, it will have significant potential for energy saving and emission reduction when applied to industries such as metallurgy, machinery, chemistry, ceramics, food, etc.

However, the porous medium combustion technology has not been widely applied in industrial production due to various limitations. From the reports, porous medium burners that have been applied in industry are mostly limited to the fields of heating at low temperature such as papermaking, textile, and drying, while the research on porous medium burners regarding to medium-high temperature heating field mostly focuses on experimental research and has not been widely applied in industry. The medium-high temperature heating field is the key to industrial production and is the most important in energy consumption and pollutant emission, therefore, it is urgently necessary to develop a porous medium burner suitable for the field of heating at medium-high temperature. During the development of a porous medium burner, a system and method for controlling the burner are the key to ensuring safe, stable, and high-efficient operation of the burner, it can be found from the current patents relating to porous medium burners that the prior patents mostly focus on the burner body and emphasize the introduction of the structure of the burner, and patents relating to systems and methods for controlling porous medium burners are reported rarely.

The porous medium burners are generally premixing-type burners, and a few of them employ diffusion combustion. At present, the common porous medium burners are mostly applied to the field of heating at low temperature (temperature below 400° C.), because of the low flame temperature during combustion, a control system therefore is generally relatively simple, and the basic idea is to use a detecting electrode to extend into the inside of the porous medium to detect the flame, the detecting electrode is connected to the burner controller, when the detecting electrode detects a flame signal, it is considered that the combustion is normal, and air and coal gas are continuously supplied, and when the detecting electrode cannot detect the flame, it is considered that a fault occurs in the combustion, and the fuel gas valve is closed. However, as the porous medium combustion technology is being popularized to the field of heating at medium-high temperatures, such control system and idea are no longer applicable, the specific defects are manifested as follows:

(1) when premixed combustion is used in the burner, it is impossible to predict and effectively prevent flashback.

A conventional open-flame premixing burner prevents flashback by maintaining a premixed gas at a certain speed value within the burner. Meanwhile a premixing-type porous medium burner prevents flashback in two ways, in the first way, flashback is prevented by disposing a porous medium with a small pore size and using a flame-quenching effect of small pores, and in the second way, flashback is prevented by maintaining the premixed gas at a certain flow rate value, however, due to the construction of the porous medium burner, this speed value is much smaller than the speed value required for preventing flashback by the conventional burner. For a porous medium burner for heating at low temperature, the porous medium is in a lower temperature environment due to low heat load per unit area of the porous medium (heat released by the fuel gas per unit area), and thus the porous medium material is not easily damaged by high temperature, and less heat is returned through the porous medium to the unburned premixed gas, so that flashback can be prevented even if the combustion condition greatly fluctuates. However, when the porous medium burner is applied to the field of heating at medium-high temperature, the porous medium as a whole is in a higher temperature environment (partially exceeding 1400° C. or even higher when a high-calorific-value gas is burned) due to high heat load per unit area of the porous medium, and more heat is returned through the porous medium to the unburned premixed gas, in the event of long-term working or a sudden change in combustion condition, there may be a situation where a porosity structure of the porous medium material is damaged by high temperature, especially the porosity of a porous medium with small pores is more easily damaged, and heat returned to the unburned premixed gas is suddenly increased, when this situation is continuously aggravated, there will be a phenomenon in which the electrode can detect the flame signal but flashback occurs in the burner. Therefore, the control idea of confirming the presence or absence of flashback simply by means of detecting the flame by an electrode is no longer applicable.

(2) When a low-calorific-value gas is used as a fuel for the burner, the existing control system cannot work.

When a low-calorific-value gas (such as blast furnace gas) is used as a fuel for the porous medium burner, since the fuel has a low calorific value, the flame formed inside the porous medium is at a low temperature and cannot be detected by the electrode at the initial stage of combustion, as the combustion proceeds, heat is returned by means of the porous medium to heat the unburned premixed gas, and a flame signal can be detected in the porous medium only when the premixed gas is heated to a certain temperature. Therefore, when a low-calorific-value gas is used as a fuel for the porous medium burner, the flame signal detected by the electrode is delayed, and the delayed time varies depending on the material of the porous medium and the type of the fuel gas, while this problem is not taken into consideration in the existing control system.

(3) It is impossible to predict or diagnose a usage (consumption) status of the porous medium material based on a real-time usage status.

The flame of the porous medium burner is existing inside the porous medium, when it is in use for a long time, the situations such as the aging of the material and the damage of the porosity structure will be inevitably encountered, when the small pore structure is damaged, a part of the flame will appear in a small pore zone, the appearance of the flame in the small pore zone further aggravates the damage of the small pore zone, when the material is damaged to a certain extent, the small pore zone loses a barrier function for preventing flashback, and flashback occurs in the burner, which is even worse when it is applied to the field of heating at medium-high temperature. Therefore, it is necessary to monitor a damage status of the porous medium material with small pores during use, when the damage reaches a certain level, the material needs to be replaced in time to avoid a safety accident.

(4) When air and a fuel gas are preheated in the burner, it is impossible to monitor a real-time working condition.

Regardless of a conventional open-flame burner or a porous medium burner, the current premixing burners do not preheat air and a coal gas in order to prevent occurrence of flashback, however, theoretically, use of waste heat of the exhaust gas for preheating air and the coal gas is the best way to recycle energy. When air or the fuel gas is being preheated, the control of the preheating temperature is very important to premixed combustion, since the premixed gas is also heated by heat returned by the porous medium in a premixing chamber, in other words, the premixed gas receives both heating energy from preheating and heating energy returned by the porous medium, and the two parts of energy are associated with each other, the preheating can increase the heat returned by the porous medium, and the increase in the returned heat can in turn increase the preheating effect, once the heat is superimposed such that the temperature of the gas reaches a certain value in the premixing chamber, a flashback explosion will be caused, and a safety accident will occur. In the actual process, the gas is generally preheated by using a heat exchanger, and the heat source is burned exhaust gas, whereas the current design level of the heat exchanger generally cannot achieve a precise control of the temperature, and the burned exhaust gas may also fluctuate at any time, and all these factors will cause the gas preheated by the heat exchanger to be unable to reach or exceed the designed temperature, whereby a flashback explosion accident occurs. For diffusion combustion, a sudden change in preheating temperature will raise the temperature of the flame in the combustion zone of the porous medium and accelerate the damage of the porous medium. Therefore, it is necessary to monitor a sudden change of the gas preheating condition that inevitably occurs in the actual process. All the existing combustion control systems do not have such function.

SUMMARY

The present disclosure employs the following technical solutions:

A system for controlling a porous medium burner of medium-high temperature heating field, comprising a local control system and a remote control system; wherein the local control system is configured for acquisition and feedback of data, and execution of an action; and the remote control system communicates with the local control system in real time and is configured for storage and analysis of data and transmission of an instruction.

Further, the acquisition and feedback of data by the local control system includes acquiring flame data and temperature data on the burner and feeding back the data to the remote control system, and the execution of an action includes receiving an instruction from the remote control system and executing functions such as ignition and opening or closing of a fuel gas control valve; the storage and analysis of data by the remote control system includes storing data information fed back by the local control system, while analyzing the data to determine whether an operation status of the burner, a usage status of a porous medium material, or the like is within a safe range; and the transmission of an instruction by the remote control system includes confirming an action that needs to be executed locally after the data is analyzed and the real-time status of the burner is determined, and transmitting the action instruction to the local control system.

A method for controlling a porous medium burner of medium-high temperature heating field, comprises the steps of:

(1) inputting, to the remote control system, parameters required by the system, including a porous medium material, type of fuel gas, delayed time, presence or absence of preheating, storage interval, storage cycle, set temperature value, and number of repeated ignitions; wherein the three parameters including the porous medium material, the type of fuel gas, and the presence or absence of preheating are input by a user, and the remaining parameters may be input by the user, or recommended data provided by a system provider may also be used as the remaining parameters;

(2) generating, by clicking, an ignition instruction at the remote control system in the case where the input of the parameters is completed and it is ensured that each device has no fault, whereby the remote control system transmits the instruction to the local control system, so that the local control system sequentially executes the respective actions of opening an air control value, opening a fuel gas control valve, and applying a voltage to an electrode for ignition, and it is considered that the ignition is successful if a flame detection module can detect a flame signal after an elapse of the delayed time input in advance and temperature data detected by a temperature detection module is normal, wherein if any one of the detection results is not normal, it is determined that the ignition fails, an ignition failure signal is fed back to the remote control system, and the remote control system repeatedly executes the above actions, and if the ignition cannot be successfully performed within the preset number of repeated ignitions, an alarm is issued and it is necessary to check the equipment;

(3) proceeding into a stage of monitoring and diagnosing an operating condition of the burner after the ignition is successful, which mainly includes monitoring and diagnosis of the material, monitoring and diagnosis of combustion, and monitoring of a preheating condition, and determining that the operation is abnormal, issuing an alarm and closing the fuel gas valve if an abnormality occurs in any one of the monitoring processes; and considering that the operation is normal and allowing the system to continue working in the case where all the monitoring processes are normal.

DETAILED DESCRIPTION OF EMBODIMENTS

The present disclosure is described in detail below with reference to the accompanying drawings and specific embodiments, wherein the specific embodiments and the description are merely intended to illustrate the present disclosure, but are not intended to limit the present disclosure.

EMBODIMENTS

Figure 1:
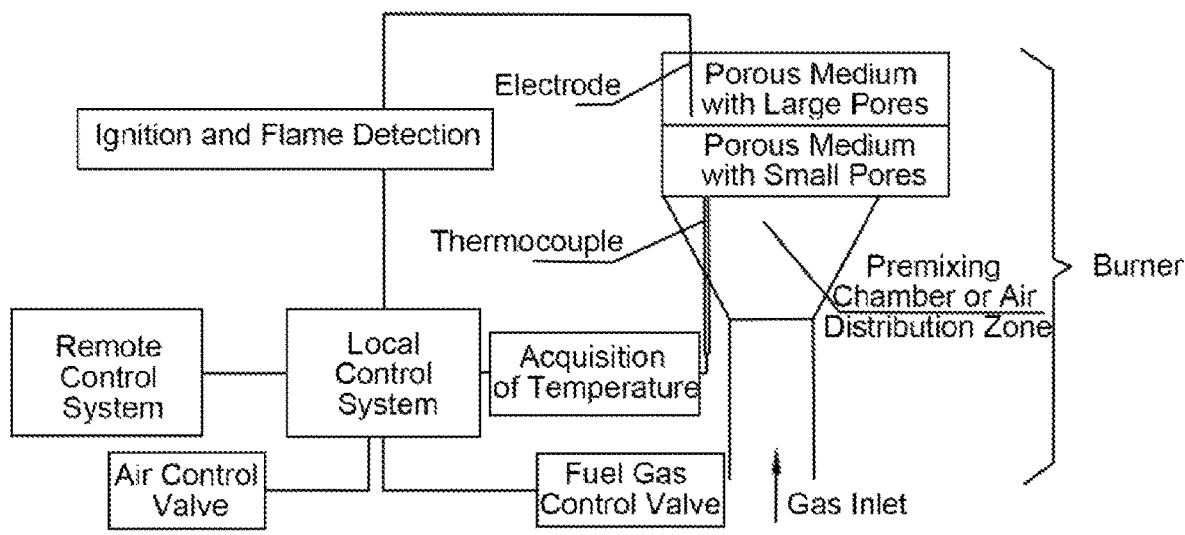
FIG. 1 is a schematic diagram showing the structural composition of a system for controlling a porous medium burner of medium-high temperature heating field according to the present disclosure.

As shown in FIG. 1, the present disclosure discloses a system for controlling a porous medium burner of medium-high temperature heating field, comprising a local control system and a remote control system. The local control system is interlocked with an air control valve and a fuel gas control valve, acquires the temperature of the burner in a premixing chamber or an air distribution zone of the burner by a thermocouple, and ignites the burner by an electrode and detects a burning status of the burner, the local control system mainly performs functions such as acquisition and feedback of data, and execution of an action, the data acquisition and feedback function refers to acquiring flame data and temperature data on the burner and feeding back the data to the remote control system, the action execution function refers to receiving an instruction from the remote control system and executing functions such as ignition and opening or closing of the fuel gas control valve. The remote control system communicates with the local control system in real time, and has the functions of storing and analyzing data and transmitting an instruction, the data storage and analysis function refers to storing data information fed back by the local control system, which facilitates the provision of key operational data required for query and product upgrade, while analyzing the data to determine whether the operation status of the burner, the usage status of a porous medium material, or the like is within a safe range. The instruction transmission function refers to confirming an action that needs to be executed locally after the data is analyzed and the real-time status of the burner is determined, and transmitting the action instruction to the local control system.

Further, the local control system is interlocked with an air control valve and a fuel gas control valve, acquires the temperature of the burner in a premixing chamber or an air distribution zone of the burner by a thermocouple, and ignites the burner by an electrode and detects a firing status of the burner.

Preferably, the remote control system is the core of the whole control system and comprises an ignition module, a flame detection module, a temperature detection module, a material usage status monitoring and diagnosis module, and a gas preheating condition online monitoring module, data and data analysis results stored in the respective modules are shared and invoked by each other.

Preferably, the ignition module is configured to undertake the function of igniting the burner, and to transmit an ignition instruction to the local control system when a combustion condition is satisfied.

Preferably, the flame detection module is configured to undertake the function of detecting a flame and determining whether the burner is in a normal operating condition, and has an alarm function when the ignition fails or the burner is in an abnormal operating condition.

Preferably, the temperature detection module undertakes the function of storing and analyzing data regarding to the temperature of a premixing chamber or an air distribution zone of the porous medium burner, determining whether the burner is ignited successfully, and giving an alarm in an abnormal situation.

Preferably, the material usage status monitoring and diagnosis module undertakes the function of monitoring and diagnosing a usage status of the porous medium material throughout the life cycle of the burner and giving an alarm in an abnormal situation, and is configured to determine whether the porous medium material can be safely and normally operated under the current usage condition.

Preferably, the gas preheating condition online monitoring module is configured to monitor whether a preheating condition satisfies the requirements for safe use when a combustion gas is being preheated, and this module does not work when the combustion gas is not preheated.

Figure 2:
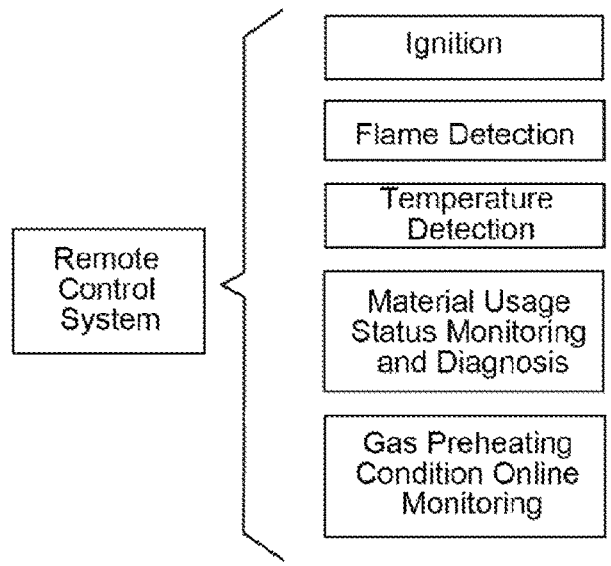
FIG. 2 is a structural diagram showing the module composition of a remote control system.

The remote control system is the core of the whole control system, undertakes the tasks of analyzing data and transmitting an instruction, and is also the key to enabling the present control system to effectively perform prediction and prevention of flashback, be adapted to combustion of gases with different calorific values, monitor and diagnose, in real time, a usage status of a porous medium material, and be suitable for the functions such as real-time monitoring of preheating of air and a fuel gas during premixed combustion. In order to achieve the above functions, the remote control system comprises the following modules: an ignition module, a flame detection module, a temperature detection module, a material usage status monitoring and diagnosis module, and a gas preheating condition online monitoring module, the data and data analysis results stored in the respective modules can be shared and invoked by each other, as shown in FIG. 2. The respective modules are described in detail as follows:

(1) ignition Module. It undertakes the function of igniting the burner, when a combustion condition is satisfied, and an operator executes this function, it transmits an ignition instruction to the local control system, and the local control system executes actions such as the actions of opening the air control valve, opening the gas control valve, and applying a voltage to the electrode to produce an electric spark to complete the ignition of the burner.

(2) Flame Detection Module. It undertakes the function of detecting a flame and determining whether the burner is in a normal operating condition, and has an alarm function when the ignition fails or the burner is in an abnormal operating condition. At an ignition starting stage, in order to satisfy the requirements for use of gases with different calorific values, the module has different flame detection procedures for fuel gases with different calorific values, and specifically, after the ignition module is executed, a flame signal is fed back at a different delayed time depending on the preset type of fuel gas. For example, supposing that the porous medium material is SiC, when natural gas is burning, the flame can be stabilized inside the porous medium and a stable signal can be detected after 20 seconds after ignition, then the flame signal is fed back at a delayed time of 20 seconds when the material is SiC and natural gas is the fuel gas; and if the porous medium material is SiC, when coke oven gas is burning, the flame can be stabilized inside the porous medium and a stable signal can be detected after 40 seconds after ignition, then the flame signal is fed back at a delayed time of 40 seconds when the material is SiC and coke oven gas is the fuel gas. That is to say, the delayed time of the flame signal is different with respect to a different porous medium material and a different type of fuel gas, the specific value of the delayed time of the flame signal may be manually input by the user, or a relevant database may also be pre-installed by the system provider. When the flame signal cannot be detected even after a period more than the delayed time has elapsed, it indicates that the ignition fails, a failure signal is fed back to the remote control system, and the remote control system issues a warning that the ignition fails. It should be noted that the exemplary description given here is only used for showing the module of the system, and does not represent the real value actually used. At a stable operation stage of the burner, the module continuously detects a flame signal and feeds back the signal to the remote control system, indicating that the flame in the burner is burning normally. Once the flame signal is interrupted at this stage, it is indicated that an abnormality occurs in the combustion in the burner, a control interface of the remote control system issues a warning of abnormal combustion and issues an instruction to the local control system, and the local control system executes an action of closing the fuel gas control valve.

(3) Temperature Detection Module. It undertakes the function of storing and analyzing data regarding to the temperature of the premixing chamber or the air distribution zone of the porous medium burner, determining whether the burner is ignited successfully, and giving an alarm in an abnormal situation. The local control system acquires temperature data by a thermocouple placed in the premixing chamber or the air distribution zone of the burner and feeds back the data to the remote control system. The remote control system stores and analyzes the temperature data by the temperature detection module, history records can be retrieved from the stored data, and the module further determines whether the burner is ignited successfully by analyzing the temperature data. Specifically, at the ignition stage, the temperature detection module analyzes a trend of change in temperature data within a certain time after the flame detection module continuously detects the flame signal, and the ignition is considered to be successful when the trend of change in temperature is reasonable. Otherwise, even if the flame detection module can continuously detect the flame signal, it is determined that the ignition is unsuccessful and an alarm signal is issued. The specific value of the time length after the temperature detection module continuously detects the flame signal may be manually input by the user, or a relevant database may also be pre-installed by the system provider. It should be noted that the temperature detection module continuously detects the temperature value throughout the life cycle of the burner, and the module determines whether the burner is ignited successfully by analyzing only the temperature data at the ignition stage, and the remaining temperature data is continuously stored in the system, and the storage interval and storage cycle may be manually input by the user or preset by the system provider in order to be adapted to the storage space of a computer.

(4) Material Usage Status Monitoring and Diagnosis Module. It undertakes the function of monitoring and diagnosing a usage status of the porous medium material throughout the life cycle of the burner, and giving an alarm in an abnormal situation, i.e., determining whether the porous medium material can be safely and normally operated under the current usage condition. Since the flame of the porous medium burner is immersed into the porous medium, the material will be inevitably damaged to a different extent when being in use for a long time, when the material is not damaged to a certain extent, it can still satisfy the requirements for normal operation, when the damage of the material exceeds a certain extent, it cannot be safely operated and needs to be replaced in time. The module monitors and diagnoses the usage status of the material by invoking and analyzing the temperature data stored in the temperature detection module. Specifically, firstly, the temperature data within a certain period (which may be one week, any number of days, or any period of time) before the current day is invoked, and a change trend thereof is analyzed; secondly, the temperature data within a certain time before the current working time point (not earlier than the current day) is invoked, and a change trend thereof is analyzed; and finally, it is analyzed whether the change is abnormal, and when the change is abnormal, it is determined that the material does not satisfy the requirements for use and needs to be replaced in time. The term "abnormal" mentioned here includes two meanings, firstly, it means that a certain change trend is maintained for a certain time, and secondly, it means that the maximum value of the temperature exceeds a certain specified value. The determination result is as follows: (1) when an abnormal change trend is continued for a certain time, but the temperature does not exceed a specified value, the system concludes that the material is continuously damaged, and has an estimated remaining service life of n hours; (2) when the maximum value of the temperature during the change exceeds a certain specified value, the system concludes that the material is damaged or is in an abnormal operating condition and it is necessary to replace the material or check the use condition, and the remote control system issues an instruction to the local control system to execute an action of closing the fuel gas control valve, and gives an alarm signal. It should be noted that the phrases such as "certain period", "certain time", and "certain value" appearing in the introduction of this module may be selected from any value unless specially specified herein.

(5) Gas Preheating Condition Online Monitoring Module. The module monitors whether the preheating condition satisfies the requirements for safe use when a combustion gas (air, and a fuel gas) is being preheated, and the module does not work when the combustion gas is not preheated. When air or the fuel gas is being preheated, the control of the preheating temperature is very important to premixed combustion, since the premixed gas is also heated by heat returned by the porous medium in the premixing chamber, in other words, the premixed gas receives both heating energy from preheating and heating energy returned by the porous medium, and the two parts of energy are associated with each other, the preheating can increase the heat returned by the porous medium, and the increase in the returned heat can in turn increase the preheating effect, once the heat is superimposed such that the temperature of the gas reaches a certain value in the premixing chamber, a flashback explosion will be caused, and a safety accident will occur. In the actual process, the gas is generally preheated by using a heat exchanger, and the heat source is burned exhaust gas, whereas the current design level of the heat exchanger generally cannot achieve a precise control of the temperature, and the burned exhaust gas may also fluctuate at any time, and all these factors will cause the gas preheated by the heat exchanger to be unable to reach or exceed the designed temperature, whereby a flashback explosion accident occurs. For diffusion combustion, a sudden change in preheating temperature will raise the temperature of the flame in the combustion zone of the porous medium and accelerate the damage of the porous medium. Therefore, it is necessary to monitor a sudden change of the gas preheating condition that inevitably occurs in the actual process. Specifically, this module invokes the real-time temperature data acquired by the temperature detection module and compares it with a set value which is confirmed depending on a different porous medium material, a different type of fuel gas, and different air and fuel gas, and when the temperature reaches or exceeds the set value, this module determines that the current preheating condition is dangerous, transmits an instruction of closing the fuel gas control value to the local control system, and gives an alarm signal and a recommended adjustment means.

Figure 3:
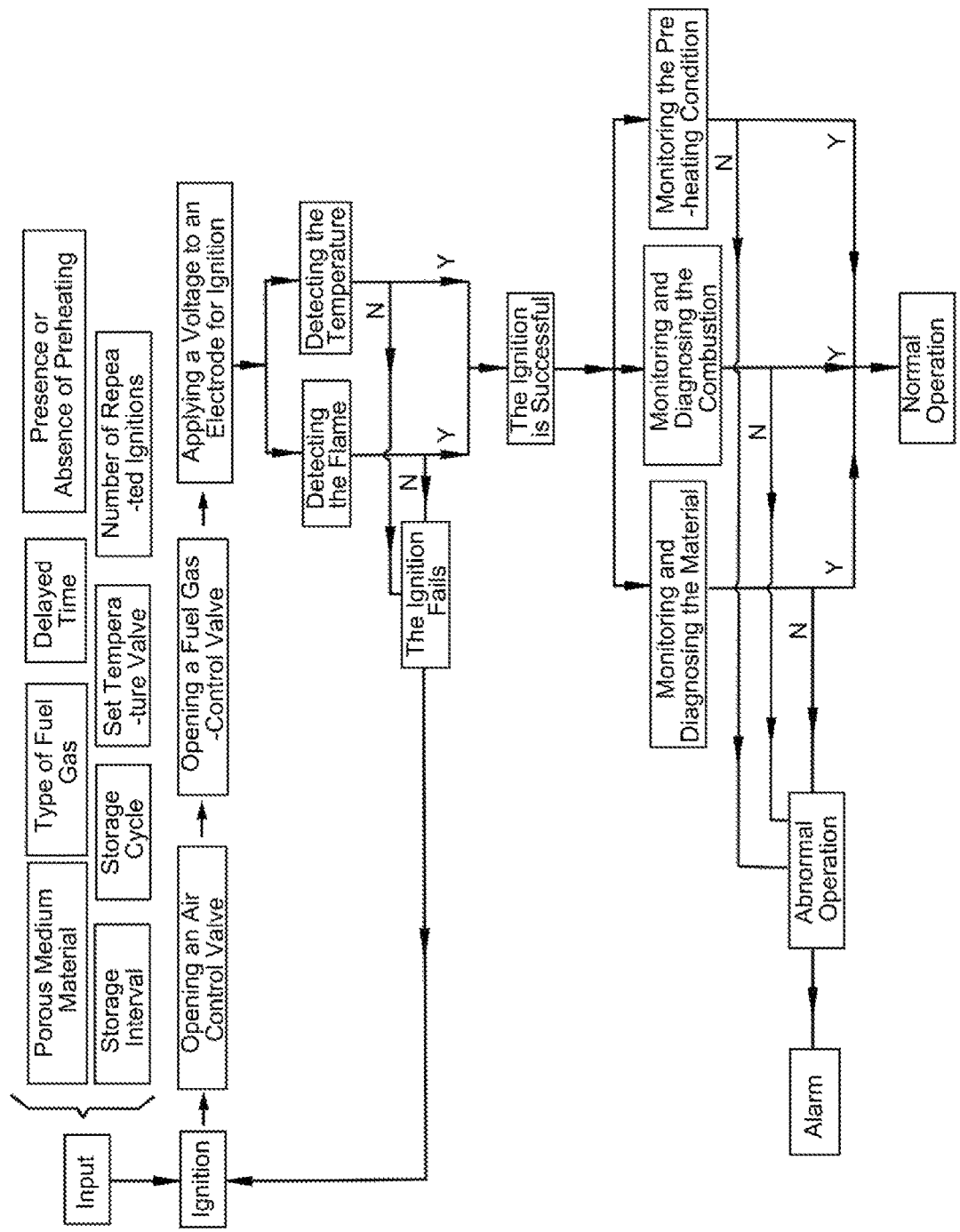
FIG. 3 is a working flowchart of a method for controlling a porous medium burner of medium-high temperature heating field according to the present disclosure.

FIG. 3 shows a working flowchart of a method for controlling a porous medium burner of medium-high temperature heating field, specifically as follows: (1) parameters required for the system are input at the remote control system, including a porous medium material, type of fuel gas, delayed time, presence or absence of preheating, storage interval, storage cycle, set temperature value, and number of repeated ignitions; wherein the three parameters including the porous medium material, the type of fuel gas, and the presence or absence of preheating are mainly input by a user, and the remaining parameters may be input by the user, or recommended data provided by a system provider may also be used as the remaining parameters; (2) an ignition instruction is clicked on at the remote control system in the case where the input of the parameters is completed and it is ensured that each device has no fault, whereby the remote control system transmits the instruction to the local control system, so that the local control system sequentially executes the respective actions of opening an air control value, opening a fuel gas control valve, and applying a voltage to an electrode for ignition, and it is considered that the ignition is successful if a flame detector can detect a flame signal after an elapse of the delayed time input in advance and temperature data detected by a temperature detection module is normal, wherein if any one of the detection results is not normal, it is determined that the ignition fails, an ignition failure signal is fed back to the remote control system, and the remote control system repeatedly executes the above actions, and if the ignition cannot be successfully performed within the preset number of repeated ignitions, an alarm is issued and it is necessary to check the equipment; (3) the process proceeds into a stage of monitoring and diagnosing an operating condition of the burner after the ignition is successful, which mainly includes several parts, i.e., monitoring and diagnosis of the material, monitoring and diagnosis of combustion, and monitoring of a preheating condition (this function is enabled or disabled depending on the input that either presence or absence of the preheating), and it is determined that the operation is abnormal, an alarm is issued, and the fuel gas valve is closed if an abnormality occurs in any one of the monitoring processes; and it is considered that the operation is normal and the system is allowed to continue working in the case where all the monitoring processes are normal.

Compared with the prior art, the present disclosure has the following beneficial effects:

(1) it is suitable for combustion in a porous medium, and can effectively perform prediction and prevention of flashback, and greatly improve the safety.

(2) It can be applied to the field of heating with a porous medium at moderate and high temperatures, and is an improvement and perfection of the control system for the field of heating with a porous medium at low temperature.

(3) It is applicable over a wide range, can adapt to the control of combustion of gases with different calorific values in porous media, and can be applied to both a porous medium burner for premixed combustion and a porous medium burner for diffusion combustion.

(4) It is controlled by using a synergic effect of the temperature and the flame signal, which is unprecedented in the existing control systems.

(5) It is capable to monitor and diagnose the usage status of a porous medium material, and to predict the service life of the porous medium material, and improve economic benefits.

(6) It is capable to effectively monitor the combustion condition in the case of preheating air and the fuel gas, and to feedback and adjust the operating parameters in the preheating device and in the heating space.

The above description is merely illustrative of preferred embodiments of the present disclosure and is not intended to limit the present disclosure. Any modifications, equivalent alternatives, improvements and so on made within the spirit and principle of the present disclosure should be included in the scope of protection of the present disclosure.

The invention claimed is:

1. A system for controlling a porous medium burner of medium-high temperature heating field, comprising a local control system and a remote control system, wherein the local control system is configured for acquisition and feedback of data, and execution of an action; and the remote control system communicates with the local control system in real time and is configured for storage and analysis of data and transmission of instructions, wherein the remote control system is the core of the whole control system and comprises an ignition module, a flame detection module, a temperature detection module, a module for monitoring and diagnosing a material usage status, and a module for online monitoring a gas preheating condition, wherein data and data analysis results stored in the respective modules are shared and invoked by each other.

2. The system for controlling a porous medium burner of medium-high temperature heating field according to claim 1, wherein the acquisition and feedback of data by the local control system includes acquiring flame data and temperature data on the burner and feeding back the data to the remote control system, and the execution of an action includes receiving instructions from the remote control system and executing functions of ignition, opening or closing of a fuel gas control valve; the storage and analysis of data by the remote control system includes storing data information fed back by the local control system, while analyzing the data to determine whether an operation status of the burner or a usage status of a porous medium material is within a safe range; and the transmission of an instruction by the remote control system includes confirming an action that needs to be executed locally after the data is analyzed and the real-time status of the burner is determined, and transmitting the action instruction to the local control system.

3. The system for controlling a porous medium burner of medium-high temperature heating field according to claim 2, wherein the local control system is interlocked with an air control valve and a fuel gas control valve, acquires the temperature of the burner in a premixing chamber or an air distribution zone of the burner by a thermocouple, and ignites the burner by an electrode and detects a burning status of the burner.

4. The system for controlling a porous medium burner of medium-high temperature heating field according to claim 1, wherein the ignition module is configured to undertake a function of igniting the burner, and to transmit an ignition instruction to the local control system when a combustion condition is satisfied.

5. The system for controlling a porous medium burner of medium-high temperature heating field according to claim 1, wherein the flame detection module is configured to undertake a function of detecting a flame and determining whether the burner is in a normal operating condition, and has an alarm function when the ignition fails or the burner is in an abnormal operating condition.

6. The system for controlling a porous medium burner of medium-high temperature heating field according to claim 1, wherein the temperature detection module undertakes a function of storing and analyzing data about the temperature of a premixing chamber or an air distribution zone of the porous medium burner, determining whether the burner is ignited successfully, and giving an alarm in an abnormal situation.

7. The system for controlling a porous medium burner of medium-high temperature heating field according to claim 1, wherein the module for monitoring and diagnosing a material usage status undertakes the function of monitoring and diagnosing a usage status of the porous medium material throughout a life cycle of the burner and giving an alarm in an abnormal situation, and is configured to determine whether the porous medium material can be safely and normally operated under the current usage condition.

8. The system for controlling a porous medium burner of medium-high temperature heating field according to claim 1, wherein the module for online monitoring a gas preheating condition is configured to monitor whether a preheating condition satisfies requirements for safe use when a combustion gas is being preheated, and the module for online monitoring a gas preheating condition does not work when the combustion gas is not preheated.

9. A method for controlling a porous medium burner of medium-high temperature heating field by using a system comprising a local control system and a remote control system, wherein the local control system is configured for acquisition and feedback of data, and execution of an action; and the remote control system communicates with the local control system in real time and is configured for storage and analysis of data and transmission of instructions, the method comprising steps of:

(1) inputting, to the remote control system, parameters required by the system, including a porous medium material, type of fuel gas, delayed time, presence or absence of preheating, storage interval, storage cycle, set temperature value, and number of repeated ignitions, wherein the three parameters including the porous medium material, the type of fuel gas, and the presence or absence of preheating are input by a user, and the remaining parameters may be input by the user, or may be recommended data provided by a system provider;

(2) generating, by clicking, an ignition instruction at the remote control system in the case where the input of the parameters is completed and it is ensured that each device has no fault, whereby the remote control system transmits the instruction to the local control system, so that the local control system sequentially executes the respective actions of opening an air control value, opening a fuel gas control valve, and applying a voltage to an electrode for ignition, and the ignition is determined as successful if a flame detection module can detect a flame signal after an elapse of the delayed time input in advance and temperature data detected by a temperature detection module is normal, wherein if any one of the detection results is not normal, the ignition is determined as failed, an ignition failure signal is fed back to the remote control system, and the remote control system repeatedly executes the above actions, and if the ignition cannot be successfully performed within the preset number of repeated ignitions, an alarm is issued and it is necessary to check equipment; and (3) proceeding into a stage of monitoring and diagnosing an operating condition of the burner after the ignition is successful, which mainly includes monitoring and diagnosis of the material, monitoring and diagnosis of combustion, and monitoring of a preheating condition, wherein the operation is determined as abnormal, an alarm is issued and the fuel gas valve is closed if an abnormality occurs in any one of the monitoring processes; and the operation is determined as normal, and allowing the system to continue working in the case where all the monitoring processes are normal.

10. The method for controlling a porous medium burner of medium-high temperature heating field according claim 9, wherein the acquisition and feedback of data by the local control system includes acquiring flame data and temperature data on the burner and feeding back the data to the remote control system, and the execution of an action includes receiving instructions from the remote control system and executing functions of ignition, opening or closing of a fuel gas control valve; the storage and analysis of data by the remote control system includes storing data information fed back by the local control system, while analyzing the data to determine whether an operation status of the burner or a usage status of a porous medium material is within a safe range; and the transmission of an instruction by the remote control system includes confirming an action that needs to be executed locally after the data is analyzed and the real-time status of the burner is determined, and transmitting the action instruction to the local control system.

11. The method for controlling a porous medium burner of medium-high temperature heating field according to claim 10, wherein the local control system is interlocked with an air control valve and a fuel gas control valve, acquires the temperature of the burner in a premixing chamber or an air distribution zone of the burner by a thermocouple, and ignites the burner by an electrode and detects a burning status of the burner.

12. The method for controlling a porous medium burner of medium-high temperature heating field according to claim 9, wherein the remote control system is the core of the whole control system and comprises an ignition module, a flame detection module, a temperature detection module, a module for monitoring and diagnosing a material usage status, and a module for online monitoring a gas preheating condition, wherein data and data analysis results stored in the respective modules are shared and invoked by each other.

13. The method for controlling a porous medium burner of medium-high temperature heating field according to claim 12, wherein the ignition module is configured to undertake a function of igniting the burner, and to transmit an ignition instruction to the local control system when a combustion condition is satisfied.

14. The method for controlling a porous medium burner of medium-high temperature heating field according claim 12, wherein the flame detection module is configured to undertake a function of detecting a flame and determining whether the burner is in a normal operating condition, and has an alarm function when the ignition fails or the burner is in an abnormal operating condition.

15. The method for controlling a porous medium burner of medium-high temperature heating field according claim 12, wherein the temperature detection module undertakes a function of storing and analyzing data about the temperature of a premixing chamber or an air distribution zone of the porous medium burner, determining whether the burner is ignited successfully, and giving an alarm in an abnormal situation.

16. The method for controlling a porous medium burner of medium-high temperature heating field according claim 12, wherein the module for monitoring and diagnosing a material usage status undertakes the function of monitoring and diagnosing a usage status of the porous medium material throughout a life cycle of the burner and giving an alarm in an abnormal situation, and is configured to determine whether the porous medium material can be safely and normally operated under the current usage condition.

17. The method for controlling a porous medium burner of medium-high temperature heating field according claim 12, wherein the module for online monitoring a gas preheating condition is configured to monitor whether a preheating condition satisfies requirements for safe use when a combustion gas is being preheated, and the module for online monitoring a gas preheating condition does not work when the combustion gas is not preheated.

\* \* \* \* \*